United States Patent [19]

Dhar

[11] Patent Number: 4,873,826
[45] Date of Patent: Oct. 17, 1989

[54] CONTROL SCHEME FOR POWER MODULATION OF A FREE PISTON STIRLING ENGINE

[75] Inventor: Manmohan Dhar, Schenectady, N.Y.

[73] Assignee: Mechanical Technology Incorporated, Latham, N.Y.

[21] Appl. No.: 291,190

[22] Filed: Dec. 28, 1988

[51] Int. Cl.$^4$ .............................................. F02G 1/04
[52] U.S. Cl. ................................... 60/641.14; 60/518; 60/520; 290/1 R
[58] Field of Search ...................... 60/641.8, 517, 518, 60/520, 641.14; 290/1 R, 51

[56] References Cited

U.S. PATENT DOCUMENTS

| | | | |
|---|---|---|---|
| 4,433,279 | 2/1984 | Bhate | 290/1 R |
| 4,567,726 | 2/1986 | Vitale et al. | 60/520 |
| 4,642,547 | 2/1987 | Redlich | 290/1 R X |
| 4,642,988 | 2/1987 | Benson | 60/518 X |
| 4,811,563 | 3/1989 | Furuishi | 60/520 X |

*Primary Examiner*—Allen M. Ostrager
*Attorney, Agent, or Firm*—Joseph V. Claeys; Joseph C. Sullivan

[57] ABSTRACT

The present invention relates to a control scheme for power modulation of a free-piston Stirling engine-linear alternator power generator system. The present invention includes connecting an autotransformer in series with a tuning capacitance between a linear alternator and a utility grid to maintain a constant displacement to piston stroke ratio and their relative phase angle over a wide range of operating conditions.

9 Claims, 8 Drawing Sheets

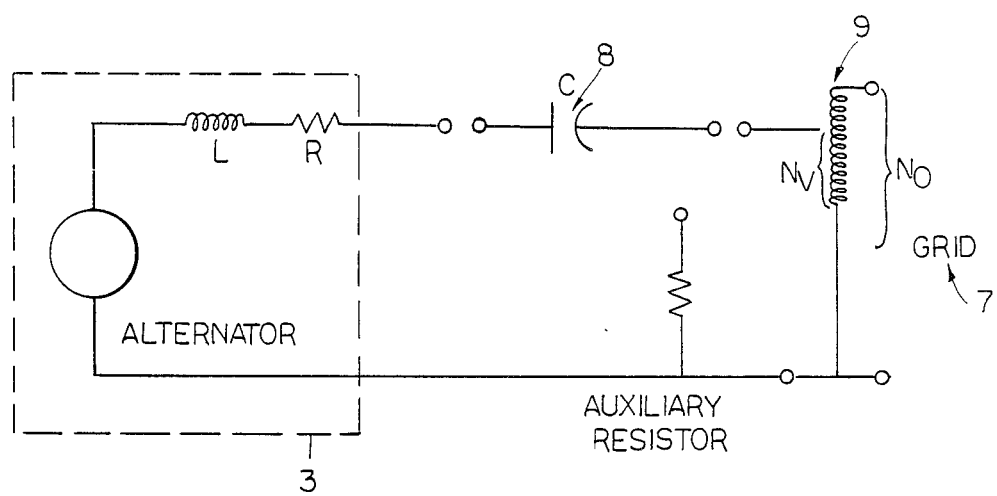
FIG. 4 CIRCUIT DIAGRAM - ALTERNATOR TO GRID
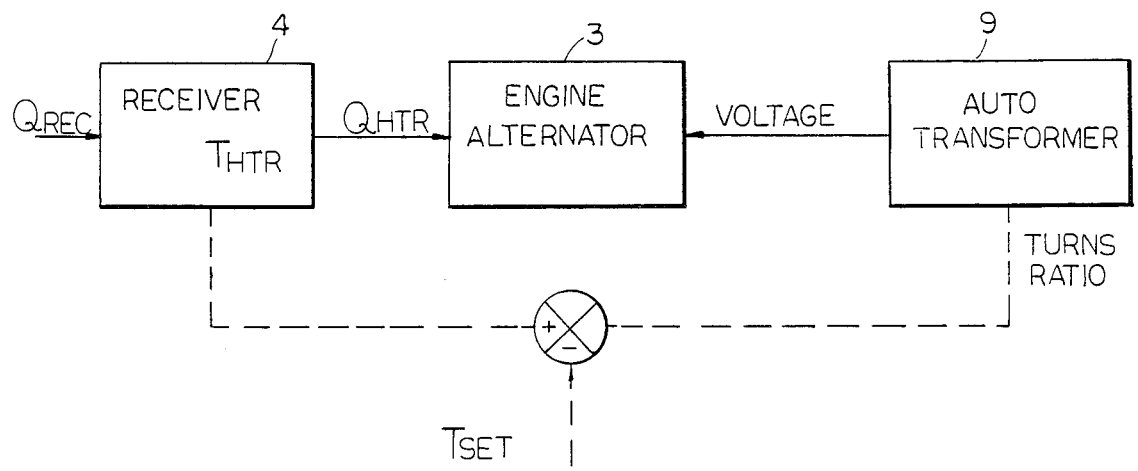
HEATER TEMPERATURE CONTINUOUS FEEDBACK CONTROL
FIG. 5

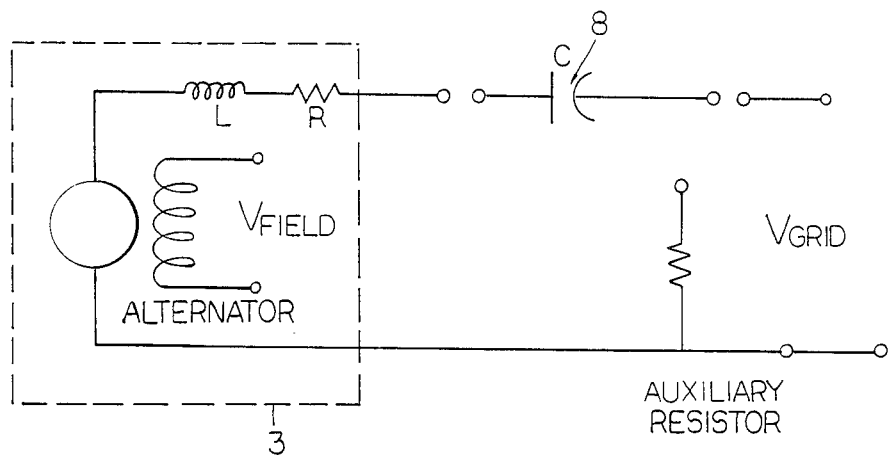
FIG. 4A  CIRCUIT DIAGRAM—ALTERNATOR TO GRID
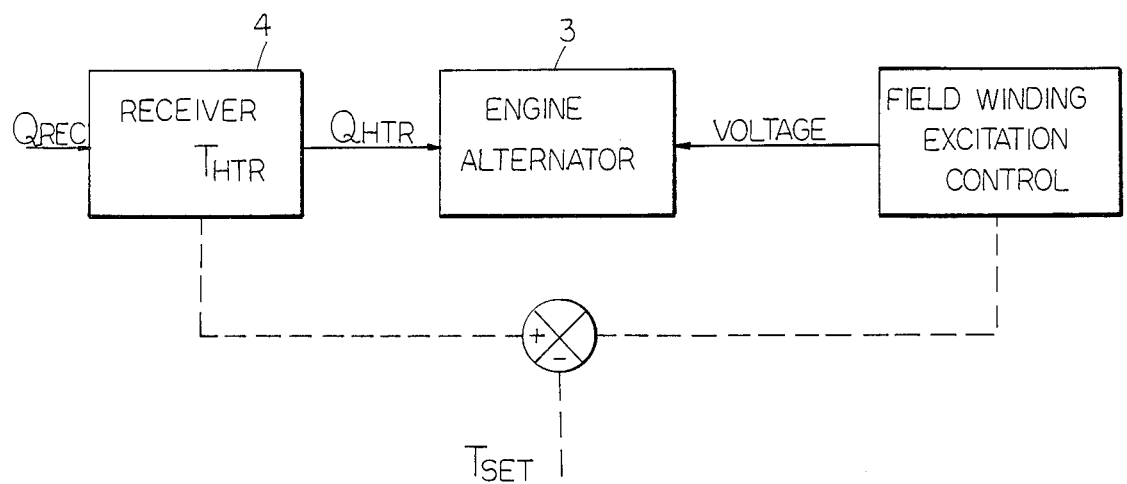
FIG. 5A  HEATER TEMPERATURE CONTINUOUS
FEEDBACK CONTROL

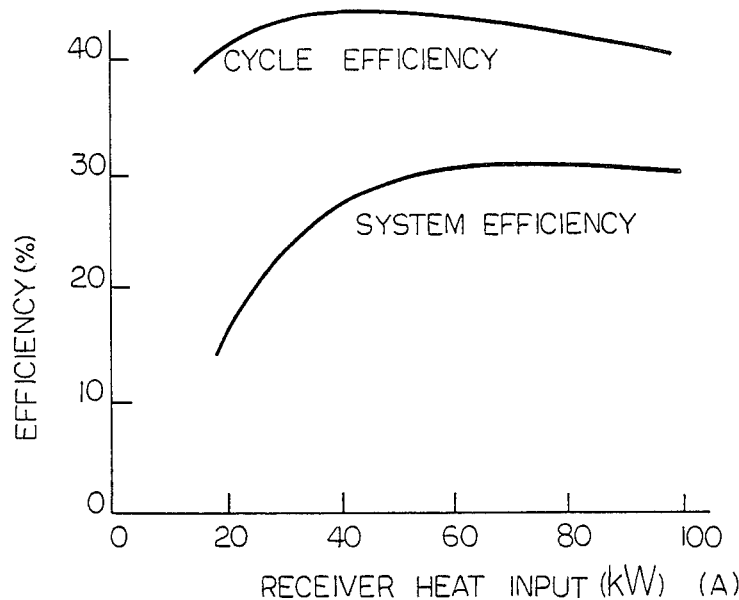
FIG. 6 EFFICIENCIES vs. HEAT INPUT (kW)
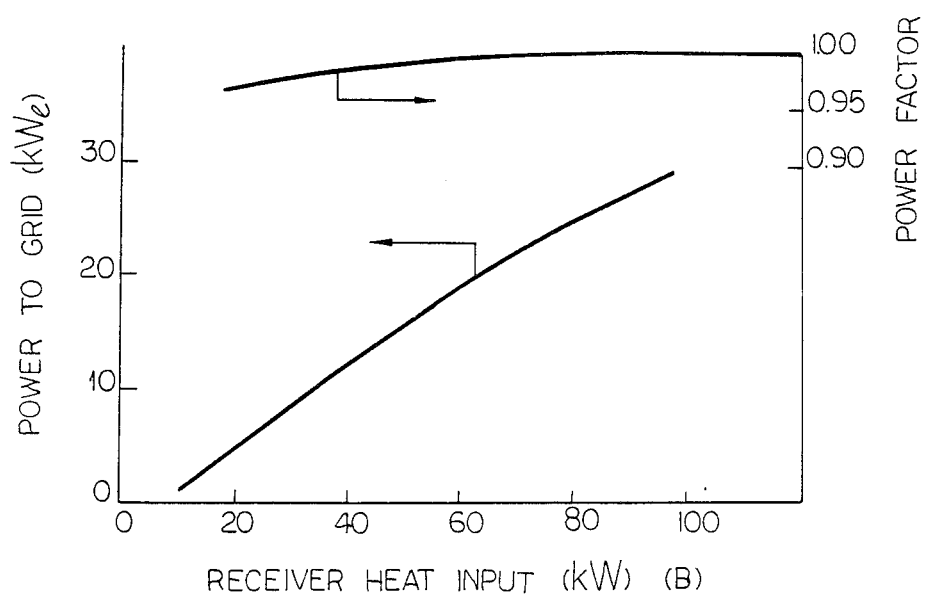
FIG. 7 NET POWER OUTPUT vs. HEAT INPUT

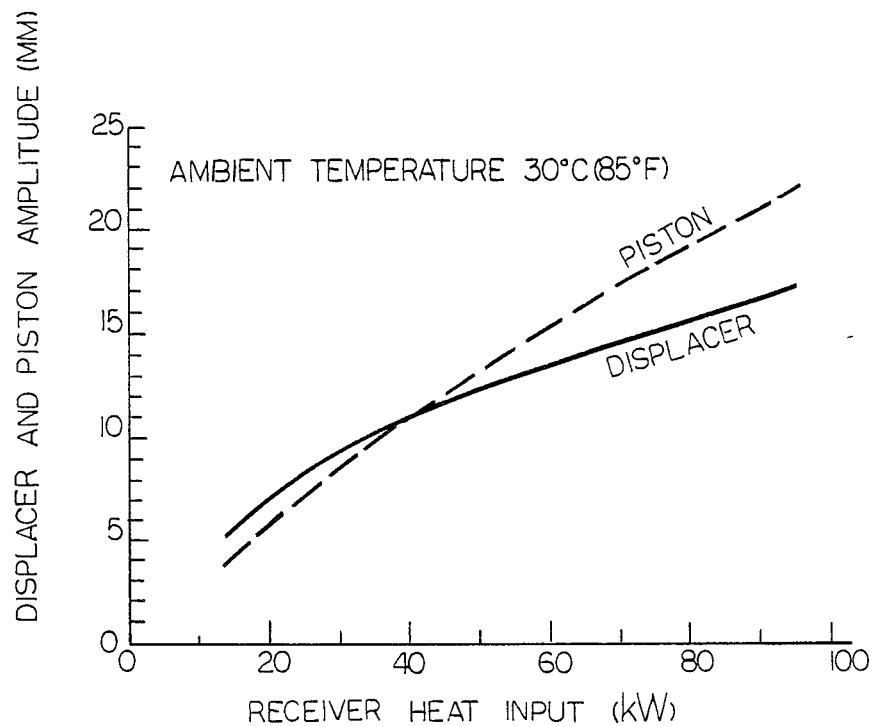
FIG. 8 DISPLACER AND PISTON AMPLITUDE vs. RECEIVER HEAT INPUT (kW)
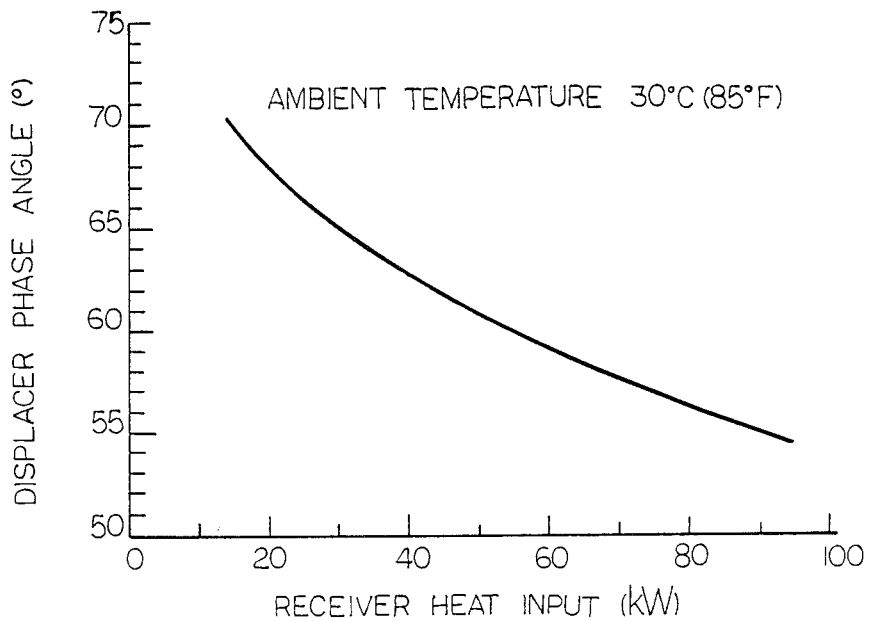
FIG. 9 DISPLACER PHASE ANGLE vs RECEIVER HEAT INPUT

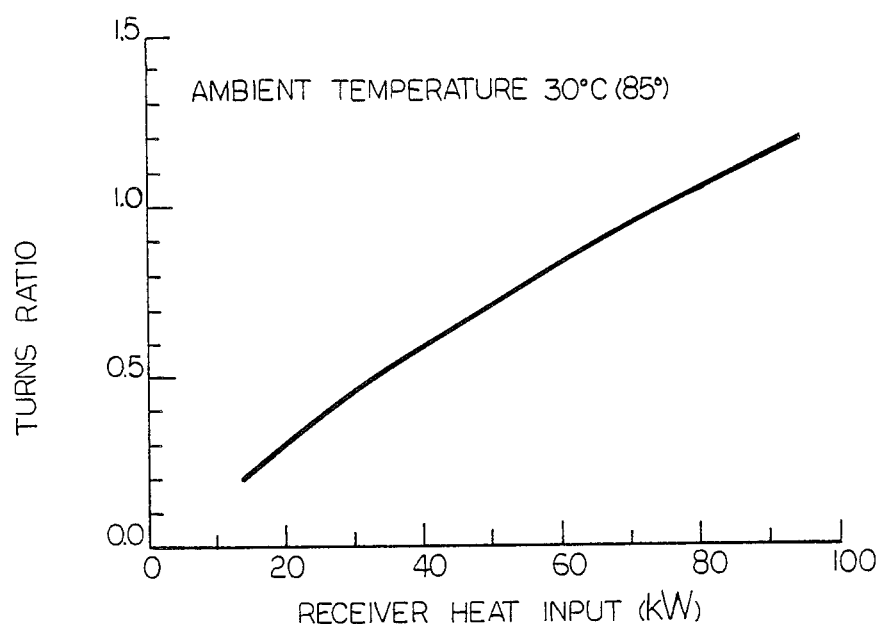
FIG. 10 TURNS RATIO vs. RECEIVER HEAT INPUT
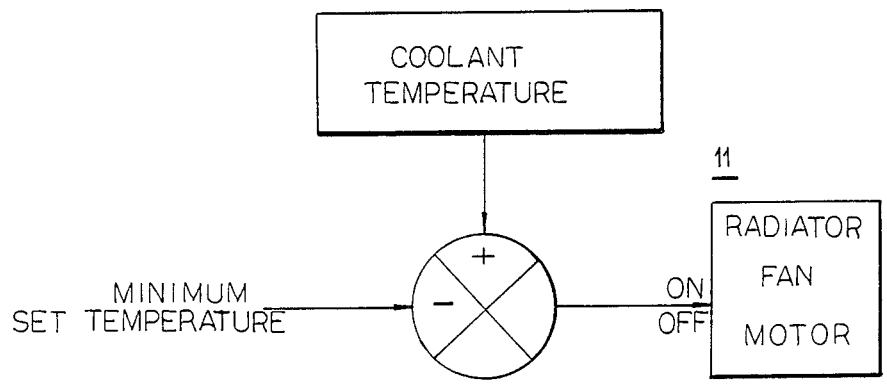
COOLANT MINIMUM TEMPERATURE CONTROL
FIG. 11

CONTROL SCHEME FOR POWER MODULATION OF A FREE PISTON STIRLING ENGINE

The Government has rights to this invention pursuant to Contract No. DFN3-372 awarded by the Department of Energy.

BACKGROUND OF THE INVENTION

The present invention relates to a control scheme for power modulation of a free-piston Stirling engine-linear alternator power generator system. In particular, the present invention relates to a control scheme for maintaining high engine cycle efficiency over a wide operating range of a free piston Stirling engine-linear alternator generator system feeding power to a utility grid.

Although not limited thereto the present invention will be described in detail in connection with a control subsystem for a solar power conversion system arrangement in which a receiver is adapted to receive concentrated solar flux from a solar collector and convert it to thermal energy. The system includes a power module which converts the thermal energy supplied to the engine heater tubes efficiently into electrical power and feeds the electrical power to a utility grid.

The problem associated with solar power conversion systems is that as the solar insolation changes from the design level, the engine operation needs to be adjusted to avoid large changes in the engine heater temperature.

Power modulation can be effected by various approaches. The output power of a free piston Stirling engine is a function of the engine heat exchanger temperature ratio (heater/cooler absolute temperature ratio), operating frequency mean pressure, and volumetric displacement of the displacer and the power piston. However, power modulation by varying the heat exchanger temperature ratio is slow due to the high thermal inertia of the heat transport sub-system and the engine proper.

A change in mean pressure would require the transfer of working fluid between the engine and a storage bottle through solenoid valves. Engine power modulation by mean pressure control is not a preferred approach in terms of reliability and cost considerations.

Further, the operating frequency cannot be changed to change the power output since the free piston engine is connected to a utility grid which operates at grid voltage.

Typical schemes for varying volumetric displacement of the displacer and the power pistons include changing the relative phase between the displacer or power piston by varying the displacer or power piston gas spring stiffness. This is accomplished by varying the respective gas spring volumes. The displacer stroke can be changed by varying the displacer gas spring damping coefficient (by introducing a controlled leak through a valve between the gas spring volume and the engine mean volume). These power modulation approaches either change the relative phase or the stroke ratio between the power piston and the displacer. Since for a given engine geometry, the thermodynamic cycle efficiency is a strong function of the displace/power piston stroke ratio and relative phase angle, power modulation by the above schemes results in a significant reduction in cycle efficiency at off-design operating points.

Accordingly it would be advantageous to develop a new approach to power modulation which avoids the drawbacks associated with the aforementioned prior art proposals.

SUMMARY OF THE INVENTION

The present invention provides a new control system which essentially maintains a constant displacer-to-piston stroke ratio and their relative phase angle, and therefore maintains a high cycle efficiency, over a wide range of operating conditions. This control scheme is especially advantageous for use in controlling the operation of a solar powered free piston Stirling engine-linear alternator generator generator system feeding power to a utility power line. In particular, the present invention provides a controlling scheme for a permanent linear alternator wherein an autotransformer is connected in series with tuning capacitance between a linear alternator and a grid. Thus, the autotransformer control scheme provides an automatic means to modulate the engine power and heat input rate in a natural manner maintaining a high efficiency over a wide operating range. It also provides a simple start-up and shut down procedure by changing the alternator terminal voltage in a continuous and smooth manner from zero to full load voltage, thus limiting the start-up and shut down transients to very low levels.

If the alternator is of the type having a field winding rather than being of the permanent magnet type, then instead of or in addition to the autotransformer, a current control means may be employed to control the energization of the field winding of the alternator to provide for maintaining the desired high engine cycle efficiency over the Stirling engine operating range.

The present invention further includes a radiator fan on-off control to provide a simple and cost effective means of allowing the power module satisfactory operation at much lower than nominal ambient temperatures.

BRIEF DESCRIPTION OF THE DRAWINGS

FIG. 4 is a diagram of an autotransformer in series between a linear alternator and a utility grid;

FIG. 4A is a diagram showing an arrangement employing field winding control;

FIG. 5 is a block diagram showing the feedback arrangement of the present invention;

FIG. 5A is a block diagram showing the feedback arrangement wherein field winding control is employed;

FIG. 6 is a graph showing system and cycle efficiency versus solar insolation absorbed by the receiver;

FIG. 7 is a graph showing power supply to grid and power factor versus solar insolation absorbed by the receiver;

FIG. 8 is a graph showing displacer and piston amplitude versus solar insolation absorbed by the receiver;

FIG. 9 is a graph showing displacer phase angle versus solar insolation absorbed by the receiver; and FIG. 10 is a graph showing transformer turns ratio versus solar insolation absorbed by the receiver.

FIG. 11 is a block diagram of the radiator fan control used in the present invention.

DETAILED DESCRIPTION OF THE PREFERRED EMBODIMENTS SYSTEM OPERATION

Figure 1:
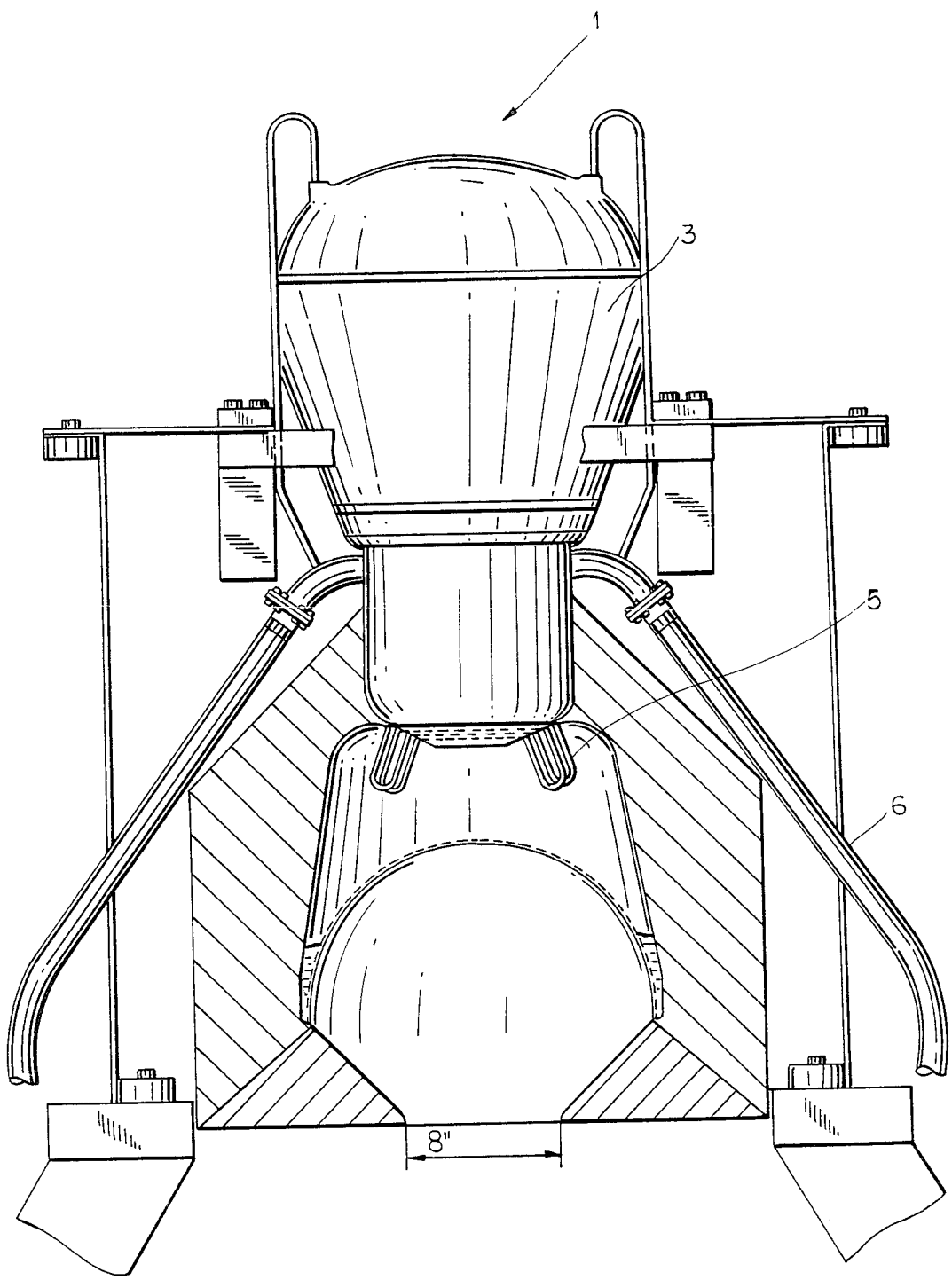
FIG. 1 is a solar power conversion system arrangement.
Figure 2:
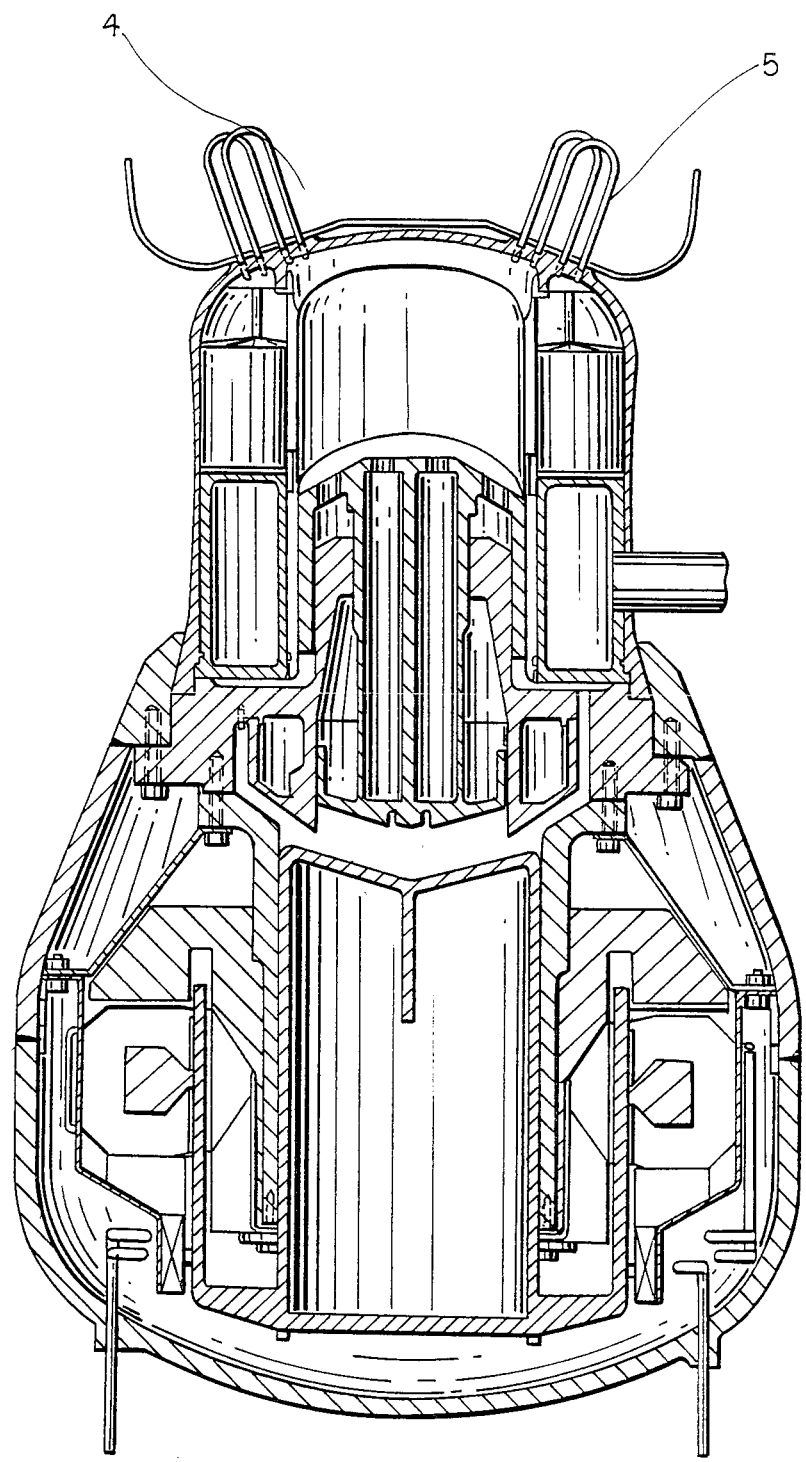
FIG. 2 is a power module comprising a free piston Stirling engine and a permanent magnet linear alternator.

FIG. 1 shows the solar power conversion system arrangement 1 for mounting on a solar dish, and FIG. 2 shows the details of a power module 2 consisting of a free piston Stirling engine and a permanent magnet linear alternator 3. The receiver 4, shown in FIG. 1, comprises a hemispherical shell which collects thermal energy from a parabolic solar collector which focuses the incident insolation through an 8 inch diameter aperture in the face of the collector. The hemispherical shell, the ellipsoidal head on the engine and the interconnecting shell form a cavity into which the engine heater tubes 5 project. A layer of sintered porous metal containing arteries to aid fluid distribution is located on the back face of the hemispherical head and about one pound of sodium is contained within the cavity. Heat transfer between the heated hemispherical shell and the engine heater tubes is based on the same principle used in conventional tubular heat pipes, except gravity is used to return the tubes condensed vapor to the sump. The engine-alternator interfaces with the system at the heater tubes, the cooler assembly and the alternator power output terminals. Heat input at the heater tubes 5 is from vaporized sodium in the receiver cavity which condenses and gives up its latent heat of vaporization. The condensed sodium returns by gravity to the sump and is distributed by capillary action in the wick over the heated shell surface. Heat is conducted across the walls of the heater tubes 5 and the helium in the engine cycles back and forth through the tubes and absorbs the heat by forced convective heat transfer. Heat which is not converted to electrical power is rejected to the cooling system at the engine alternator coolers. FIG. 1 shows the cooling lines 6. The coolant is a water/glycol mixture which is circulated through an air-cooled radiator. The radiator, motor-driven fan, water pump and thermostatic control comprise the cooling system.

The solar power conversion system 1 can be conveniently divided into the following four major subsystems:

Heat supply subsystem
Power module subsystem
Heat reject subsystem
Control subsystem The heat supply subsystem consists of a receiver 4 and a thermal energy transport medium. The purpose of the receiver 4 is to receive concentrated solar flux from the collector and to efficiently convert it into thermal energy.

The purpose of the power module 2 is to convert the thermal energy supplied to the engine heater tubes 5 efficiently into electrical power and to feed that electrical power to the utility grid 7. The power module 2 includes a displacer type free piston Stirling engine directly connected to a linear alternator 3. The linear alternator 3 is connected to the grid 7 in series with a tuning capacitor 8 and an autotransformer 9.

The purpose of the heat rejection subsystem is to remove waste heat from the power module 2 and to reject it to the atmosphere.

The purpose of the control system is to maintain proper operation at design conditions, and to respond automatically to system faults. The control subsystem includes:

(1) an autotransformer 9, which modulates the engine heater heat flux rate to match the solar insolation rate received by the receiver 4, and (2) a radiator fan motor on-off control 11 (FIG. 11) which allows safe and proper system operation over a wide ambient temperature range.

Figure 3:
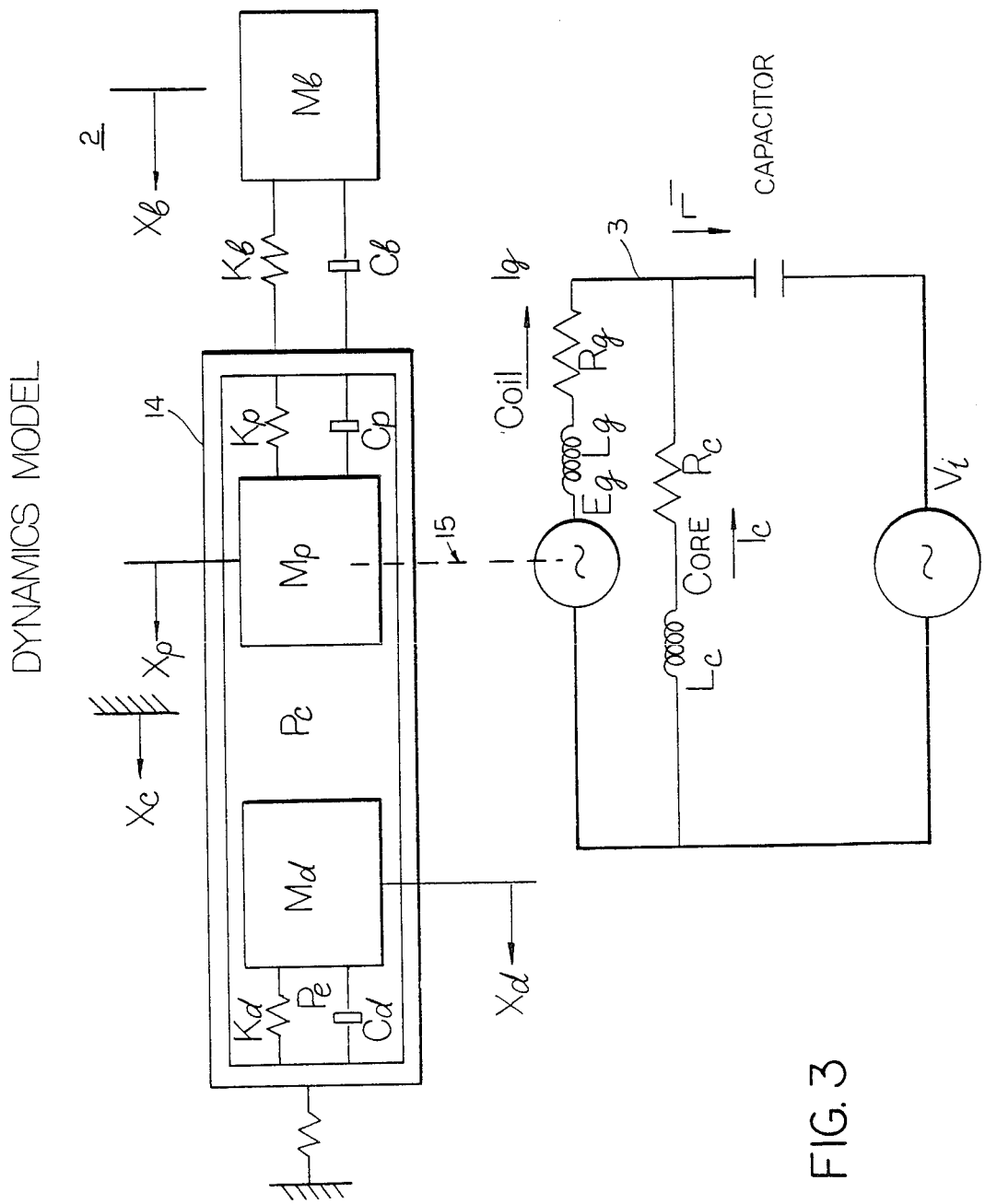
FIG. 3 is a block diagram of the power module of FIG. 2 showing the free piston engine coupled to a permanent magnet alternator.

Referring now to the drawings, FIG. 3 shows the block diagram of a power module 2 including a free piston engine coupled to a permanent magnet alternator 3.

The free piston engine 14 includes two moving parts: a displacer piston (mass Md) and a power piston (mass Mp). Each piston is acted on by their respective gas spring dynamic elements. In addition, the two pistons dynamically interact with each other through the engine working gas. The motion of the displacer and power pistons (Md, Mp) result in pressure waves in the expansion and compression spaces of the Stirling engine 14. The amplitude of the pressure wave is primarily a function of piston amplitude, and the phase angle of the pressure wave depends on displacer/piston stroke ratio and the temperature profile of the working gas.

The cycle power available at the power piston Mp is proportional to the vector dot product of the compression space pressure wave and the power piston velocity. If the engine mean pressure and heat exchanger temperatures are assumed to be constant, the engine power generation is proportional to the square of the power piston displacement amplitude. The heater flux rate demand is proportional to the dot product of the expansion space pressure wave and the displacer velocity, and to the first order, is independent of heater temperature. Therefore engine heat flux rate is also proportional to the square of the power piston displacement amplitude.

The alternator is a permanent magnet linear alternator 3 with plunger 15 rigidly coupled to the power piston Mp. The alternator plunger motion (and therefore power piston motion) causes a change in the alternator coil flux linkage which induces voltage in the coil at a frequency equal to that of the plunger oscillation. The product of the induced voltage and the coil current is the shaft power of the alternator supplied by the engine. Since a permanent magnet alternator does not employ a separate field excitation, the magnitude of the induced voltage is proportional to the plunger velocity. Therefore for fixed frequency operation, induced voltage is linearly proportional to the power piston displacement amplitude. For a grid connected system, the engine/alternator behaves essentially as an externally excited vibratory system, with the grid voltage acting as a system forcing function. During steady state operation, the following dynamic characteristics exit:

The amplitude of oscillation of the displacer and power piston is proportional to the grid voltage (or the voltage applied at the alternator terminals if a transformer is placed between the power module and the grid). This is because the power piston motion is proportional to Eg and in turn Eg is proportional to the voltage supplied at the alternator terminals.

The frequency of piston oscillation is equal to the source (grid) voltage.

Heater heat flux rate demand and power module power output are proportional to the square of the alternator terminal voltage.

By changing the turns ratio of the autotransformer 9, voltage $V_1$ is varied which results in power piston (and displacer piston) stroke variation thus controlling heater heat flux demand.

DESCRIPTION OF THE CONTROL SCHEME

It is necessary for the solar power conversion system to operate over a wide solar insolation range. As solar insolation changes from the design level, the engine operation requires adjustment to avoid a large change in the engine heater temperature. This is accomplished by incorporating an autotransformer 9 in series between the alternator 3 and the grid 7 (FIG. 4). The autotransformer 9 controls the engine heater head temperature as shown schematically in FIG. 5. $Q_{rec}$ is the solar insolation into the receiver. $Q_{htr}$ is the heat flux rate absorbed by the engine. $T_{htr}$ is the average temperature, and $T_{set}$ is the desired temperature of the heater. If $Q_{rec}$ increases due to higher solar insolation, $T_{htr}$ increases which sends a positive signal to the motor of the autotransformer. This signal in turn moves the transformer brush to increase the transformer turns ratio thereby increasing the voltage amplitude at the alternator terminals which is $(Nv/No)/V_{grid}$.

As indicated previously, when a permanent magnet type alternator is employed it is necessary to utilize an autotransformer to change the terminal voltage. On the other hand where the alternator has a field winding, the autotransformer is not necessary and the power module may be controlled by suitable control of the excitation of the alternator field winding.

Increased voltage at the alternator terminals increases the power piston and displacer amplitude resulting in increased $Q_{htr}$ which lowers the error signal. If $Q_{rec}$ decreases, a negative error signal results, and sequence of operation if reversed, resulting in decrease in $Q_{htr}$. This is a very simple control scheme which maintains high cycle efficiency over a large operating range. This is because the control scheme does not change the basic dynamic parameters (effective damping and spring coefficients of the power module) and therefore maintains essentially a constant displacer-to-piston stroke ratio and their relative phase.

For a 25 kW free-piston Stirling engine linear alternator solar power conversion unit, FIGS. 6 through 10 show predicted system efficiency, cycle efficiency, power supply to grid, power factor, displacer and piston amplitudes, displacer-to-piston phase angle, transformer turns ratio plotted against solar insolation absorbed by the receiver. These plots show that the engine thermodynamic efficiency is essentially flat over the whole operating range. The power factor of the generated electrical power is close to unity over the whole range. Net electrical power is generated even at as low as 15% of the maximum solar insolation rate to the receiver.

OPERATION OVER AMBIENT TEMPERATURE RANGE

A free piston Stirling engine is sensitive to the variation in ambient temperature due to the effect of compression space and cooler temperature on engine working fluid mean pressure. A change in mean pressure changes the natural frequency of the displacer and the power piston which causes a change in the engine dynamic. As the ambient temperature increases from the nominal design level, the engine mean pressure increases resulting in a higher displacer-to-piston phase angle, causing a engine volumetric displacement. As ambient temperature decreases from the nominal level, the engine mean pressure decreases resulting in a lower displacer-to-piston phrase angle, causing lower volumetric displacement. Therefore, as ambient temperature decreases the capability of the engine to generate power as well as absorb heater heat flux rate decreases. The loss of power generation and heater heat absorption at low ambient temperatures can be eliminated by providing an on-off heat rejection radiator fan control 11 as shown in FIG. 11.

The minimum set temperature is the cooler wall temperature below which the engine heat flux rate demand is less than the maximum solar insolation rate to the engine. If with decrease in ambient temperature, the cooler wall temperature drops below the maximum set temperature the radiator fan is turned off. The cooler wall temperature is compared to the desired minimum set temperature, and if the resulting error signal is negative the radiator fan is turned off and if the error is positive the radiator fan is turned on.

Thus, the present invention provides a field winding control or an autotransformer control with automatic means for modulating engine power and heat input rate in a natural manner, maintaining a high efficiency over a wide operating range. It also provides a simple start-up and shut down procedure by changing the alternator terminal voltage in a continuous and smooth manner from zero to full load voltage, thus limiting the start-up and shut down transients to very low levels. The radiator fan on-off control 11 (FIG. 11) provides a simple and cost effective means of allowing the power module 2 satisfactory operation at much lower than nominal temperature.

Obviously, numerous modifications and variations of the above described preferred embodiment are possible in view of this disclosure.

It is, therefore, to be expressly understood that these modifications and variations, and the equivalents thereof, may be practiced while remaining within the spirit and scope of the invention which is defined by the following claims, wherein I claim:

1. A control system for power modulation of a free piston Stirling engine, comprising:
   a receiver adapted to absorb solar energy and to convert said solar energy into thermal energy;
   a power module comprising a displacer type free piston Stirling engine having power and displacer pistons, and a linear alternator connected to said engine, said power module adapted to receive and to convert said thermal energy into electrical energy;
   a utility grid adapted to receive the electrical energy from said power module;
   an autotransformer connected in series between said linear alternator and said grid, said autotransformer being connected by feedback means to said receiver so that a change in solar insolation to the receiver varies the autotransformer turns ratio thus changing said linear alternator's terminal voltage and changing power piston and displacer piston amplitude accordingly to maintain a high engine efficiency cycle over a large operating range for solar insolation absorbed by said receiver.

2. A control system according to claim 1 wherein a tuning capacitance is connected in series with said autotransformer, said capacitance adjusting said linear alternator reactance to maintain stable system operation over the full operating range.

3. A control system according to claim 1 wherein said autotransformer has a brush and said feedback control means includes a motor adapted to receive a error signal from said receiver in response to change in solar insolation and to move the brush of said autotransformer thus varying its turns ratio in response to said error signal.

4. A control system according to claim 3 wherein upon receipt of a positive error signal by said motor, said motor moves said transformer brush to increase the turns ratio thereby increasing voltage amplitude at the terminals of said linear alternator and upon receipt of a negative error signal by said motor, said motor moves said transformer brush to decrease the turns ratio thereby decreasing voltage amplitude at the terminals of said linear alternator.

5. A control system according to claim 4 wherein said linear alternator is a permanent magnet linear alternation having a plunger rigidly connected to said power piston so that motion by said plunger effects motion of said power piston causing a change in alternator coil flux linkage thereby reducing voltage in the coil at a frequency equal to that of the plunger oscillation.

6. A control system according to claim 1 further comprising a radiator for motor on-off control to provide safe and proper operation of said power module for below normal ambient temperature.

7. A control system according to claim 1 further comprising a solenoid operated pneumatic valve to shut down said engine in the event electrical control is lost.

8. A control system for power modulation of a free piston Stirling engine, comprising:
   means for producing thermal energy;
   a power module comprising a displacer type free piston Stirling engine having power and displacer pistons, and a linear alternator connected to said engine, said power module adapted to receive and to convert said thermal energy into electrical energy;
   a utility grid adapted to receive the electrical energy from said power module;
   means for controlling the terminal voltage of said alternator and changing power piston and displacer piston amplitude accordingly to maintain a high engine efficiency cycle over a large operating range.

9. A control system according to claim 1, wherein said alternator has a field winding and the power module is controlled by controlling the excitation of said field winding.

* * * * *